(12) United States Patent
Ivans et al.

(10) Patent No.: US 11,987,350 B2
(45) Date of Patent: May 21, 2024

(54) WINGED TILTROTOR AIRCRAFT

(71) Applicant: Textron Innovations Inc., Providence, RI (US)

(72) Inventors: Steven Ray Ivans, Ponder, TX (US); Brent Chadwick Ross, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 105 days.

(21) Appl. No.: 17/303,631

(22) Filed: Jun. 3, 2021

(65) Prior Publication Data
US 2022/0388647 A1 Dec. 8, 2022

(51) Int. Cl.
| | |
|---|---|
| B64C 29/00 | (2006.01) |
| B64C 1/00 | (2006.01) |
| B64C 5/02 | (2006.01) |
| B64C 7/02 | (2006.01) |
| B64C 27/80 | (2006.01) |
| B64C 39/02 | (2023.01) |
| B64C 39/04 | (2006.01) |
| B64U 10/20 | (2023.01) |
| B64U 30/297 | (2023.01) |
| B64U 30/20 | (2023.01) |

(52) U.S. Cl.
CPC ............ *B64C 29/0033* (2013.01); *B64C 1/00* (2013.01); *B64C 5/02* (2013.01); *B64C 7/02* (2013.01); *B64C 27/80* (2013.01); *B64C 39/024* (2013.01); *B64C 39/04* (2013.01); *B64U 10/20* (2023.01); *B64U 30/297* (2023.01); *B64U 30/20* (2023.01)

(58) Field of Classification Search
CPC ......................... B64C 29/0033; B64U 30/297
See application file for complete search history.

(56) References Cited

U.S. PATENT DOCUMENTS

| | | | |
|---|---|---|---|
| 5,709,357 A | 1/1998 | Wilmowsky | |
| 5,758,844 A * | 6/1998 | Cummings | B64C 29/0033 244/66 |

(Continued)

FOREIGN PATENT DOCUMENTS

| | | | |
|---|---|---|---|
| CN | 105775117 B | 3/2019 | |
| FR | 3051440 A1 * | 11/2017 | ......... B64C 29/0033 |

(Continued)

*Primary Examiner* — Nicholas McFall
*Assistant Examiner* — Terri L Filosi
(74) *Attorney, Agent, or Firm* — Whitaker Chalk Swindle & Schwartz, PLLC; Enrique Sanchez, Jr.; Bradley J. Birchfield

(57) ABSTRACT

A tandem tiltrotor aircraft in which the tiltrotor assemblies are operably coupled at the forward and aft ends of the fuselage of the aircraft is disclosed. The tiltrotor assemblies are capable of rotating between a vertical lift position and a horizontal flight position. The in-line location of the tiltrotor assemblies allow the aircraft to have the vertical take-off and landing capabilities, and, in combination with the at least one wing, can be used in horizontal flight. The aft rotor assembly can assume a horizontal flight position that places the rotor blades forward of a vertical fin of the aircraft. In another embodiment, a winged triple tiltrotor aircraft is disclosed. In another embodiment, a winged quad tiltrotor aircraft is disclosed.

25 Claims, 7 Drawing Sheets

(56) References Cited

U.S. PATENT DOCUMENTS

| | | | |
|---|---|---|---|
| 5,961,068 A * | 10/1999 | Wainfan | B64C 1/0009 |
| | | | 244/91 |
| 9,085,355 B2 | 7/2015 | DeLorean | |
| 10,450,062 B1 | 10/2019 | Bova et al. | |
| 10,518,873 B2 | 12/2019 | Netzer | |
| 11,603,193 B2 * | 3/2023 | Kim | B64U 10/25 |
| 2009/0045294 A1 * | 2/2009 | Richardson | B64C 27/26 |
| | | | 244/7 A |
| 2018/0222580 A1 | 8/2018 | DeLorean | |
| 2018/0370629 A1 | 12/2018 | Finlay et al. | |
| 2019/0061936 A1 | 2/2019 | North et al. | |
| 2019/0100303 A1 * | 4/2019 | Campbell | B64C 27/26 |
| 2021/0009264 A1 * | 1/2021 | Chang | B64C 5/06 |

FOREIGN PATENT DOCUMENTS

| | | |
|---|---|---|
| RU | 2507122 C1 | 2/2014 |
| WO | 2017153807 | 9/2017 |

* cited by examiner

WINGED TILTROTOR AIRCRAFT

TECHNICAL FIELD

The present invention is generally related tiltrotor aircraft, and specifically to winged tiltrotor aircraft.

BACKGROUND

Like helicopters, traditional tiltrotor aircraft are utilized in situations in which vertical take-off and landing of the aircraft is desired. Once in the air, and as the aircraft starts to propel itself forward, the rotors of the aircraft tilt from a vertical to a horizontal position to better facilitate horizontal flight. Traditional tiltrotor aircraft incorporate the rotors into the wing tips of the aircraft, while other disclosures place tiltrotor assemblies along a fuselage. Increasing the number of rotor assemblies on an aircraft can offer several advantages, such as increased thrust during vertical takeoff that can facilitate load-bearing capabilities of the aircraft. However, there are nevertheless several issues with incorporating more rotor assemblies into a single aircraft.

For example, the placement of rotor assemblies on the wing requires the wing to carry the aircraft weight cantilevered at the far end of the wing. To facilitate this design, a considerable amount of structural support is required in the wings of the aircraft because the wing must be much stronger at its extremes than a normal airplane wing. Further, including tiltrotor assemblies along an aircraft fuselage offers its own set of challenges. Additionally, each rotor assembly adds to the aircraft's drag profile, a consideration that must be accounted for.

With these challenges in mind, traditional tiltrotor aircraft are generally incompatible with the incorporation of rotors along the fuselage of the aircraft because such placement could impede the usage of a functional cockpit. Conventional tandem rotor aircraft, while able to incorporate rotors along the fuselage of the aircraft, are limited since the rotors do not tilt and thus do not require the same amount of space as the rotors of tiltrotor aircraft. Like tiltrotor aircraft, tandem rotor aircraft are used in situations in which vertical take-off and landing is desired. However, because the rotors of conventional tandem rotor aircraft are not able to tilt, the aircraft do not have the desirable horizontal flight properties of tiltrotor aircraft.

SUMMARY

A winged tandem tiltrotor aircraft in accordance with the principles of the present disclosure can allow for a horizontal flight mode that can successfully utilize both a forward rotor assembly and an aft rotor assembly by enabling the aft rotor assembly to assume a forward-facing position. For example, an aft rotor assembly can be coupled to a vertical fin extending from an elongated member and have rotor blades sized to clear the elongated member while rotating in a forward-facing position. In another embodiment, a winged tandem tiltrotor aircraft can be optimized for aerodynamic performance without the limitations associated with carrying a nacelle at the wing tip (on ground) and conversely without carrying the loads in the wing from the nacelles at the wingtip during hovers.

In another embodiment, a winged triple tiltrotor aircraft can provide for increased vertical lift and horizontal thrust by utilizing an aft rotor capable of assuming a forward-facing position, and further including additional rotor assemblies, such as on a wing or wings of an aircraft. In one embodiment, including an aft rotor assembly on an aircraft can increase the pitch control of the aircraft. In another embodiment, a winged quad tiltrotor aircraft can incorporate advantages offered by both a tandem system and a triple system. For example, a winged quad tiltrotor aircraft can include an aft rotor assembly coupled to a vertical member that can provide both vertical lift and horizontal thrust. The winged quad tiltrotor aircraft can also, in one embodiment, incorporate a forward rotor assembly, a port-side rotor assembly, and a starboard-side rotor assembly to maximize vertical lift and horizontal thrust. In one embodiment, the winged quad tiltrotor aircraft can provide increased pitch control by including both a forward and an aft rotor assembly. In another embodiment, the winged triple and winged quad tiltrotor aircrafts can provide for increased yaw and roll control by including port- and starboard-side rotor assemblies.

In one embodiment a winged tandem tiltrotor aircraft can include: an elongated member having a forward end, an aft end, and a longitudinal axis extending through the elongated member; a wing assembly operably coupled to the elongated member between the forward end and the aft end; a vertical member having a first end operably coupled to the elongated member and upwardly extending a first distance from the elongated member; an aft rotor assembly having aft rotor blades and operably coupled to a second end of the vertical member, the aft rotor assembly operably rotatable between a vertical lift position and a horizontal flight position, in line with the longitudinal axis of the elongated member; a forward rotor assembly having forward rotor blades and operably coupled to the elongated member proximate the forward end, the aft rotor assembly operably rotatable between a vertical lift position and a horizontal flight position, in line with the longitudinal axis of the elongated member; wherein the aft rotor blades have a length shorter than the first distance such that the aft rotor blades do not contact the elongated member. Wherein the elongated member can be a fuselage or nacelle. Further comprising a tail structure disposed between the elongated member and the vertical member. Wherein the tail structure is a tail boom. Wherein the tail structure is twin tail booms. Wherein the vertical member is part of an empennage. Wherein the tiltrotor aircraft is unmanned. The winged tandem tiltrotor aircraft further comprising a chine. Wherein the winged tandem tiltrotor aircraft can be configured to adjust rotational speeds of the rotor assemblies to counteract a torque effect produced by one or more of the rotor assemblies.

In another embodiment, a winged triple tiltrotor aircraft can include: an elongated member having a forward end, an aft end, and a longitudinal axis extending through the elongated member; a wing assembly operably coupled to the elongated member at a point between the forward end and the aft end; a vertical member having a first end operably coupled to the elongated member and upwardly extending a first distance from the elongated member; an aft rotor assembly having aft rotor blades and operably coupled to a second end of the vertical member, the aft rotor assembly operably rotatable between a vertical lift position and a horizontal flight position, in line with the longitudinal axis of the elongated member; a port-side rotor assembly having port-side rotor blades and operably coupled to the wing assembly proximate a port-side wing tip, wherein the port-side rotor assembly is operably rotatable between a vertical lift position and a horizontal flight position; a starboard-side rotor assembly having starboard-side rotor blades and operably coupled to the wing assembly proximate a starboard-side wing tip, wherein the starboard-side rotor assembly is operably rotatable between a vertical lift position and a horizontal flight position; and wherein the aft rotor blades have a length shorter than the first distance such that the aft rotor blades do not contact the elongated member. Wherein the elongated member can be a fuselage or nacelle. Wherein the tiltrotor aircraft is configured to adjust rotational speeds of the rotor assemblies to counteract a torque effect produced by one or more of the rotor assemblies. The winged triple tiltrotor aircraft further comprising a tail structure disposed between the elongated member and the vertical member. Wherein the vertical member can be part of an empennage. Wherein the tiltrotor aircraft can be unmanned. The winged triple tiltrotor aircraft further comprising a chine.

In another embodiment, a winged quad tiltrotor aircraft can include: an elongated member having a forward end, an aft end, and a longitudinal axis extending through the elongated member; a wing assembly operably coupled to the elongated member between the forward end and the aft end; a vertical member having a first end operably coupled to the elongated member and upwardly extending a first distance from the elongated member; an aft rotor assembly having aft rotor blades and operably coupled to a second end of the vertical member, the aft rotor assembly operably rotatable between a vertical lift position and a horizontal flight position, in line with the longitudinal axis of the elongated member; a forward rotor assembly having forward rotor blades and operably coupled to the elongated member proximate the forward end, the aft rotor assembly operably rotatable between a vertical lift position and a horizontal flight position, in line with the longitudinal axis of the elongated member; a port-side rotor assembly having port-side rotor blades and operably coupled to the wing assembly proximate a port-side wing tip, wherein the port-side rotor assembly is operably rotatable between a vertical lift position and a horizontal flight position; a starboard-side rotor assembly having starboard-side rotor blades and operably coupled to the wing assembly proximate a starboard-side wing tip, wherein the starboard-side rotor assembly is operably rotatable between a vertical lift position and a horizontal flight position; and wherein the aft rotor blades have a length shorter than the first distance such that the aft rotor blades do not contact the elongated member. Wherein the elongated member can be a fuselage or nacelle. Wherein the tiltrotor aircraft is configured to adjust rotational speeds of the rotor assemblies to counteract a torque effect produced by one or more of the rotor assemblies. The winged quad tiltrotor aircraft, further comprising a tail structure disposed between the elongated member and the vertical member. Wherein the tiltrotor aircraft is unmanned.

In another embodiment, a method of operating a triple tiltrotor aircraft, can include the steps of: initiating a first rotor assembly and a second rotor assembly disposed in a first plane, and a third rotor assembly disposed in a second plane, wherein each of the first, second, and third rotor assemblies have rotor blades and are operably rotatable between a vertical lift position and a horizontal flight position; and counteracting a torque effect caused by at least one of the first, second, or third rotor assemblies with at least one other of the first, second, or third rotor assemblies. Wherein the tiltrotor aircraft can utilize differential control of at least one of the first, second, or third rotor assemblies to counteract a torque effect produced by at least one other of the first, second, or third rotor assemblies. Wherein a swept area of at least one of the first, second, or third rotor assemblies can be smaller than a swept area of at least one other of the first, second, or third rotor assemblies.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The invention presented in the following written description and the various features and advantageous details thereof are explained more fully with reference to the non-limiting examples included in the accompanying drawings and as detailed in the description which follows. Descriptions of well-known components and are omitted so to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1A:
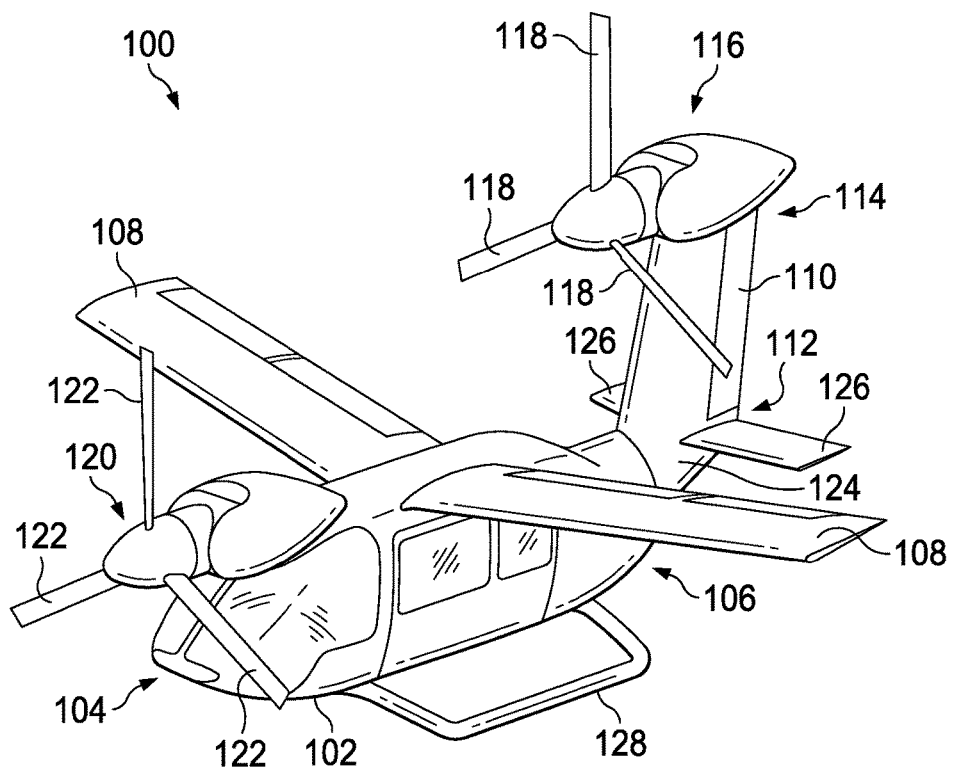
FIGS. 1A-1B illustrate an exemplary winged tandem tiltrotor aircraft, in accordance with one or more exemplary embodiments of the present disclosure.
Figure 1B:
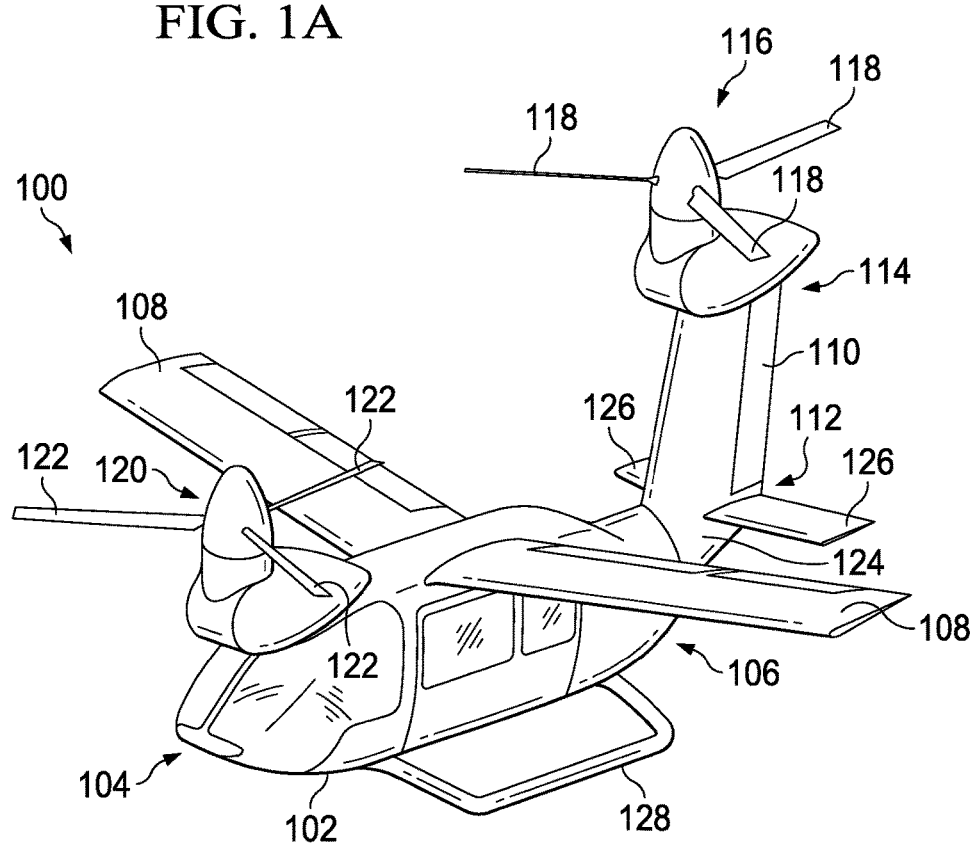

FIGS. 1A-1B depict perspective views of a winged tandem tiltrotor aircraft, designated generally as 100, in accordance with an embodiment of the present disclosure. The tandem tiltrotor aircraft 100 can include an elongated member 102. In one embodiment, the elongated member 102 can be a fuselage, nacelle, tail boom, or other suitable aircraft structure. In another embodiment, the elongated member 102 can have a forward end 104 and an aft end 106. In another embodiment, the aircraft 100 can include a wing assembly 108. In one embodiment, the wing assembly 108 can include one or more main wings, canard wings, fairings, stabilizers, booms, or other suitable structure. In another embodiment, the wing assembly 108 can be configured to provide lift for sustained horizontal flight and can be operably coupled to the elongated member 102 at a point between the aft end 106 and forward end 104 of the elongated member 102. For example, the wing assembly 108 can include a single wing that can traverse the elongated member 102; in another example, the wing assembly 108 can include two or more wings coupled to the elongated member 102. In another embodiment, the aircraft 100 can further include a vertical member (e.g., vertical fin, pylon, etc.) 110. In on embodiment, the vertical fin 110 can include a first end 112 and a second end 114, and the first end 112 can be operably coupled to the elongated member 102. In another embodiment, the vertical member 110 can extend a first distance from the elongated member 102. For example, the first distance can be a length and/or height of the vertical member 110.

In another embodiment, the aircraft 100 can include an aft rotor assembly 116. In one example, the aft rotor assembly 116 can be operably coupled to the second end 114 of the vertical member 110. The aft rotor assembly 116 can include aft rotor blades 118. In one embodiment, the aft rotor assembly 116 can be operably rotatable between a vertical lift position and a horizontal flight position. As an example, FIG. 1A can depict a horizontal flight position, wherein the aft rotor assembly 116 is rotated such that the aft rotor blades 118 are positioned forward of the vertical member 110. In one embodiment, the aircraft 100 can be configured such that aft rotor assembly 116 can rotate to and operate in a horizontal flight position without the aft rotor blades 118 contacting the elongated member 102. For example, a length of the aft rotor blades 118 can be shorter than the first distance such that the aft rotor blades 118 do not contact the elongated member 102. In another embodiment, the aircraft 100 can include a forward rotor assembly 120. In one embodiment, the forward rotor assembly 120 can include forward rotor blades 122. In another embodiment, the forward rotor assembly 120 can be operably coupled to the elongated member 102 proximate the forward end 104 of the elongated member 102. In another exemplary embodiment, the aft rotor assembly 116 can be disposed in a plane above the forward rotor assembly 120.

In one embodiment, both the aft and the forward rotor assemblies 116, 120 can be configured to be rotatably positioned between a vertical lift position and a horizontal flight position. For example, the rotor assemblies 116, 120 can be configured to rotate in-line with a longitudinal axis of the elongated member 102, or orthogonal to a longitudinal axis of the elongated member 102. The vertical lift position for each rotor assembly 116, 120 being a position in which the rotor assembly can be aligned substantially vertically, and the horizontal flight position for each rotor assembly being a position in which the rotor faces substantially horizontally. The forward rotor assemblies 116, 120 can be aligned substantially vertically if they can lift the fuselage from the ground, independently or in concert. The rotor assemblies 116, 120 can be aligned substantially horizontally, if they can move the fuselage horizontally along the fuselage axis, independently or in concert. Each rotor assembly 116, 120 can be configured to be operable for propulsion as they rotate between the lift and horizontal flight positions. Further, each rotor assembly 116, 120 can be configured to stop at any selected location along its rotation between the lift and flight positions and continue propulsion operation at that selected location. In one embodiment, the aircraft 100 can be configured as a manned aircraft; in another embodiment, the aircraft 100 can be an Unmanned Aerial Vehicle (UAV).

The rotor assemblies 116, 120 are not limited to any specific design. The embodiments disclose any type of rotor assembly used or potentially used in the propulsion of aircraft. In one embodiment, the rotors assemblies 116, 120 can be propeller type rotors, the forward rotor assembly 120 comprising a plurality of propeller blades 122, the aft rotor assembly 116 comprising a plurality of propeller blades 118.

In another embodiment, the aircraft 100 can include a tail structure 124 disposed between the aft end 106 of the elongated member 102 and the vertical member 110. For example, the tail structure 124 can be a tail boom. In another example, the tail structure 124 can be considered as part of the elongated member 102; in another embodiment, the tail structure 124 can be considered part of the aft end 106 of the elongated member. In another embodiment, the tail structure 124 can be considered a part of the vertical member 110; in another embodiment, the tail structure 124 can be considered a part of the first end 112 of the vertical member 110. In another embodiment, the tail structure 124 can be any component suitable to couple the vertical member 110 to the elongated member 102.

In another embodiment, the aircraft 100 can include an empennage proximate the aft end 106 of the elongated member 102. For example, the vertical member 110 can be considered part of the empennage of the aircraft 100. In another embodiment, the aircraft 100 can include a horizontal assembly 126 (e.g., horizontal stabilizer, horizontal fin, etc.). For example, the horizontal assembly 126 can include two horizontal fins 126 on a port side and a starboard side of the tail structure 124 or vertical member 110. The horizontal assembly 126 can be considered part of the empennage of the aircraft 100. In another embodiment, the horizontal assembly 126 can be operably rotatable between a vertical position and a horizontal position. For example, the horizontal assembly 126 can be configured to rotate long a longitudinal axis of the horizontal assembly 126, until a lateral axis of the horizontal fin assembly 126 is substantially perpendicular with a longitudinal axis of the elongated member 102. In this manner, and as an example, the horizontal fin assembly can be configured in a vertical position, such as by minimizing a profile of the horizontal fin assembly 126 as to an air download generated by, e.g., the aft rotor assembly 116. In another embodiment, the horizontal assembly 126 can also be rotated such that a lateral axis of the horizontal assembly 126 can be substantially parallel with a longitudinal axis of the elongated member 102, such as to minimize a profile of the horizontal assembly 126 during forward flight and facilitate stabilization of the aircraft 100. In another embodiment, the horizontal assembly 126 be rotated anywhere from 0°-360° around its longitudinal axis. In another embodiment, the aircraft 100 can include landing gear 128. The landing gear 128 can take the form of skids, floats, wheels, retractable wheels, or any other suitable landing gear 128 to facilitate the landing of the aircraft 100.

In one embodiment of the disclosure, and as exemplified by FIG. 1B, the aircraft 100 can be configured for vertical lift. The vertical lift position for the forward rotor assembly 120 can be configured such that the forward rotor assembly 120 can be aligned substantially vertically (e.g., in an upward-facing vertical position). The vertical lift position for the aft rotor assembly 116 can be configured such that the aft rotor assembly 116 can be aligned in an upward-facing vertical position (e.g., substantially vertically). As discussed above, the rotor assemblies 116, 120 can be any type of rotor assembly suitable for the propulsion of aircraft. In one embodiment, the rotor assemblies 116, 120 can be propeller type rotors, the plurality of propeller blades 118, 122 can be configured to have a positive pitch angle, such that as the rotor assemblies 116, 120 provide thrust for aircraft 100 propulsion, the plurality of propeller blades 118, 122 operate to "pull" aircraft 100 off of the ground substantially vertically, into the air. Rotor assemblies that work to "pull" aircraft are commonly referred to as "puller rotors," as the rotation of the propeller blades create a thrust away from a payload.

In another embodiment, FIG. 1A illustrates a perspective view of a winged tandem tiltrotor aircraft arranged in a horizontal flight position, in accordance with various embodiments of the present disclosure. The horizontal flight position for the forward rotor assembly 120 can be configured such that the forward rotor assembly 120 can be aligned substantially horizontally (e.g., in a forward-facing horizontal position). The horizontal flight position for the aft rotor assembly 116 can be configured such that the aft rotor assembly 116 can be aligned in a forward-facing horizontal position (e.g., substantially horizontally). As discussed above, the rotor assemblies 116, 120 can be any type of rotor assembly suitable for the propulsion of aircraft.

Figure 2A:
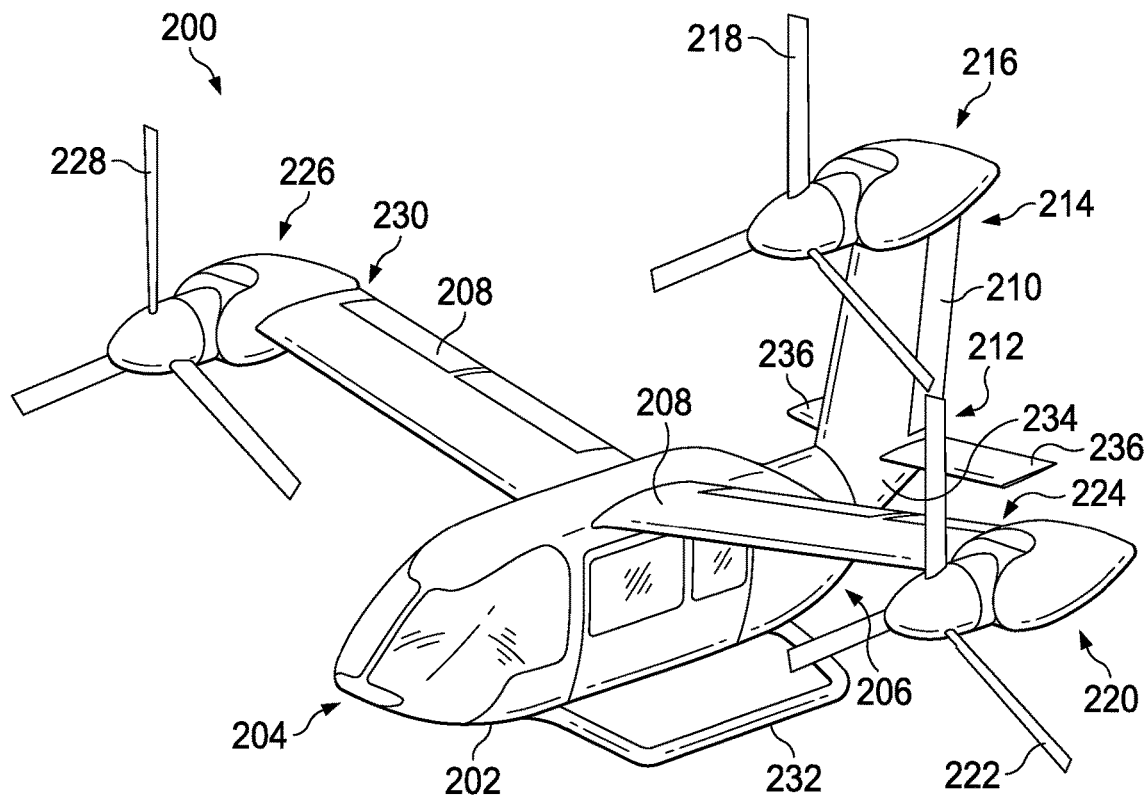
FIGS. 2A-2C illustrate an exemplary winged triple tiltrotor aircraft, in accordance with one or more exemplary embodiments of the present disclosure.
Figure 2B:
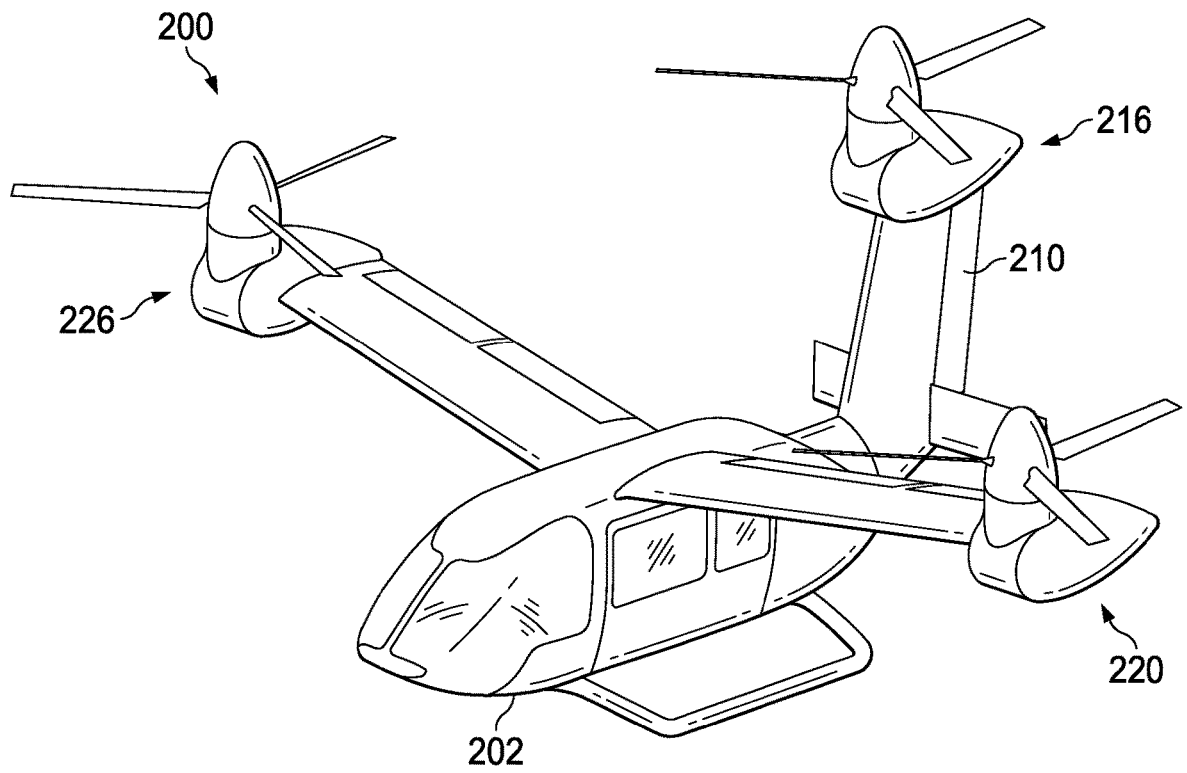
Figure 2C:
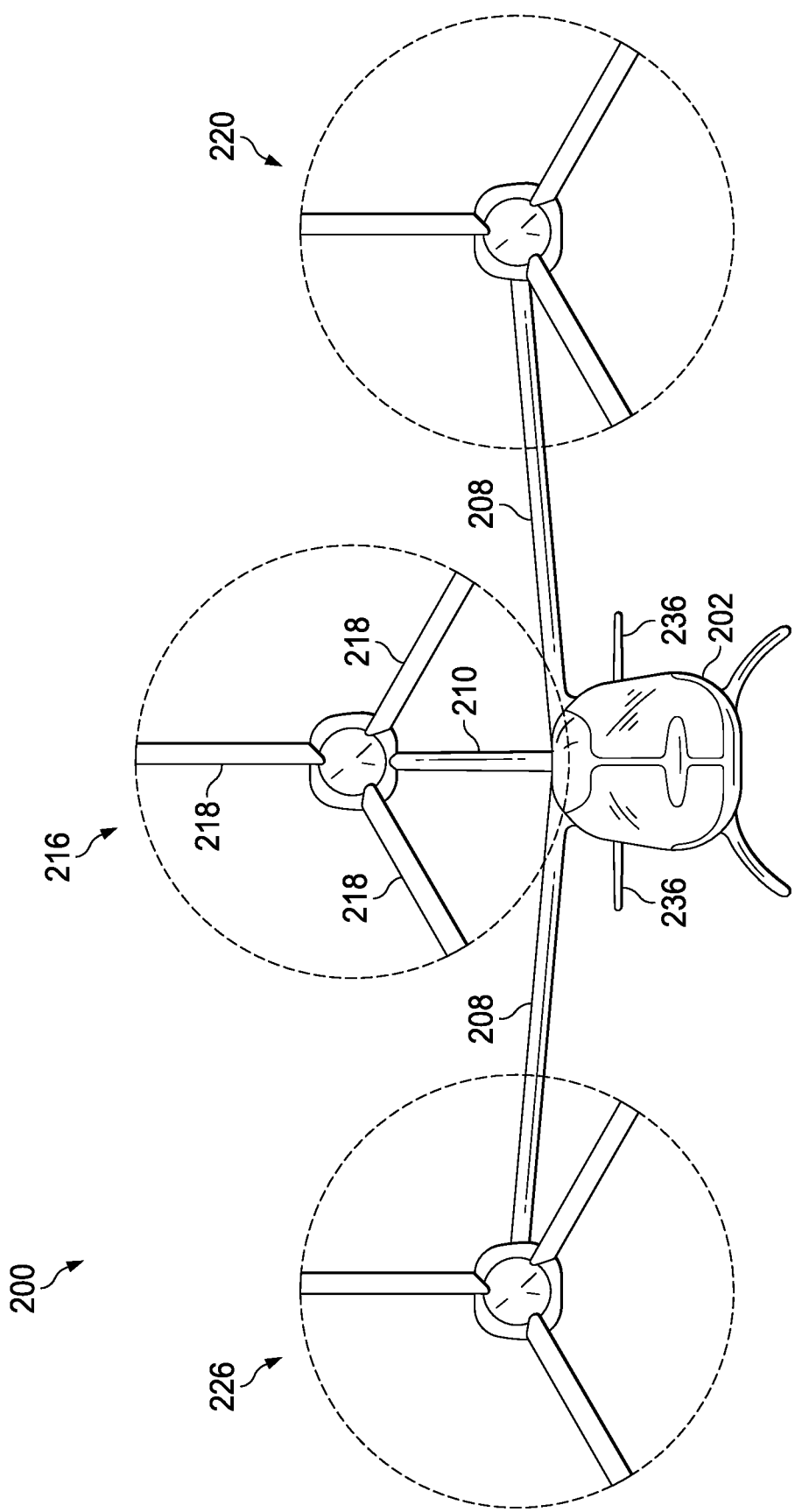

FIGS. 2A-2C depicts another embodiment of a winged tiltrotor aircraft, in accordance with one or more embodiments of the present disclosure. In one embodiment, the aircraft 200 can include a port-side rotor assembly 220 proximate a port-side wing tip 224 of a wing assembly 208, and a starboard-side rotor assembly 226 proximate a starboard-side wing tip 230 of a wing assembly 208. In another embodiment, the aircraft 200 can include an elongated member 202 having a forward end 204 and an aft end 206. The elongated member 202 can include a fuselage, nacelle, tail boom, or other suitable aircraft structure. The aircraft 200 can further include a wing assembly 208 coupled to the elongated member 202 between the forward end 204 and the aft end 206. In another embodiment, the aircraft 200 can include a vertical member (e.g., vertical fin, pylon, etc.) 210 operably coupled to the elongated member 202 and upwardly extending a first distance from the elongated member 202, such that the length of the vertical member 210 can be equal to the first distance. For example, the vertical member 210 can include a first end 212 operably coupled to the elongated member 202. In one embodiment, the aircraft 200 can include an aft rotor assembly 216. For example, the aft rotor assembly 216 can include rotor blades 218. In one embodiment, the aft rotor assembly 216 can be operably coupled to a second end 214 of the vertical member 210.

In another embodiment, the aircraft 200 can include a port-side rotor assembly 220 proximate a port-side wing tip 224 of the wing assembly 208, and a starboard-side wing rotor assembly 226 proximate a starboard-side wing tip 230 of the wing assembly 208. In one embodiment, the port-side rotor assembly 220 can include port-side rotor blades 222, and the starboard-side rotor assembly 226 can include starboard-side rotor blades 228. The aft, port-side, and starboard-side rotor assemblies 216, 220, 226 can each be operably rotatable between a vertical lift position and a horizontal flight position. In one embodiment, FIGS. 2A and 2C can illustrate an exemplary configuration of each rotor assembly in a horizontal flight position. In another embodiment, FIG. 2B can illustrate an exemplary configuration of each rotor assembly in a vertical lift position. In another embodiment, the vertical member 210 can be part of an empennage. In another embodiment, the empennage can include a horizontal stabilizer 236. In one embodiment, the horizontal stabilizer 236 can be configured to rotate about a longitudinal axis of the horizontal stabilizer. In another embodiment, the aircraft 200 can further include a tail structure 234 disposed between the vertical member 210 and the elongated member 202. In another embodiment, the aircraft 200 can include any suitable landing gear 232, such as skids or wheels.

As can be seen in, e.g., FIG. 2C, the aft rotor assembly 216 can be configured to achieve a horizontal flight position such that the aft rotor blades 218 can be positioned forward of the vertical fin 210. In one embodiment, the aft rotor blades 218 can be of a length shorter than the vertical fin length (e.g., first height), such that the aft rotor blades 218 do not contact the elongated member 202 and/or tail structure 234. In another embodiment, the aft rotor blades 218 can be sized to suit a particular application, so long as the aft rotor blades 218 do not contact the elongated member 202 and/or tail structure 234.

In one embodiment, the aircraft 200 can be configured such that the overall torque effect on the aircraft 200 can be substantially zero. For example, each of the aft, starboard-side, and port-side rotor assemblies 216, 220, 226 can be configured to rotate at different speeds to counteract a torque effect produced by one or more of the rotor assemblies. In another embodiment, one or more of the rotor assemblies 216, 220, 226 can include an articulated rotor and/or flapping rotor, such that differential control of one or more of the rotor assemblies 216, 220, 226 can be utilized to counteract a torque effect produced by one or more of the other rotor assemblies. For example, one or more of the rotor assemblies 216, 220, 226 can be configured to allow for adjustment of a single blade of the assembly and/or all of the blades of the assembly, such as to, for example, vary a torque effect produced by a one or more of the rotor assemblies 216, 220, 226. In another embodiment, one or more of the rotor assemblies 216, 220, 226 can include a canted rotor. In another embodiment, one or more of the rotor assemblies 216, 220, 226 can include a coaxial rotor. In another embodiment, a swept area of one or more of the rotor assemblies 216, 220, 226 can be smaller than a swept area of one or more other of the rotor assemblies 216, 220, 226. For example, one of the rotor assemblies 216, 220, 226 can produce less thrust and/or torque than one or more other of the rotor assemblies 216, 220, 226. In another embodiment, rotor blades of one or more of the rotor assemblies 216, 220, 226 can have a shorter length than rotor blades of one or more other of the rotor assemblies 216, 220, 226. In another embodiment, one or more of the rotor assemblies 216, 220, 226 can be configured to rotate at the same speed as one or more other of the rotor assemblies 216, 220, 226. In another embodiment, one or more of the rotor assemblies 216, 220, 226 can include rigid rotors.

The winged triple tiltrotor aircraft 200 can provide several advantages over traditional tiltrotor aircrafts. For example, the aft rotor assembly 216 can provide for increased vertical lift and pitch control. Additionally, the aft rotor assembly 216 can provide for increased horizontal thrust in horizontal flight mode. The aft rotor assembly 216 can also rotate such that the aft rotor blades 218 can be forward of the vertical member 210, which, in one embodiment, can facilitate the aft rotor assembly's 216 provision of horizontal thrust in horizontal flight mode.

Figure 3A:
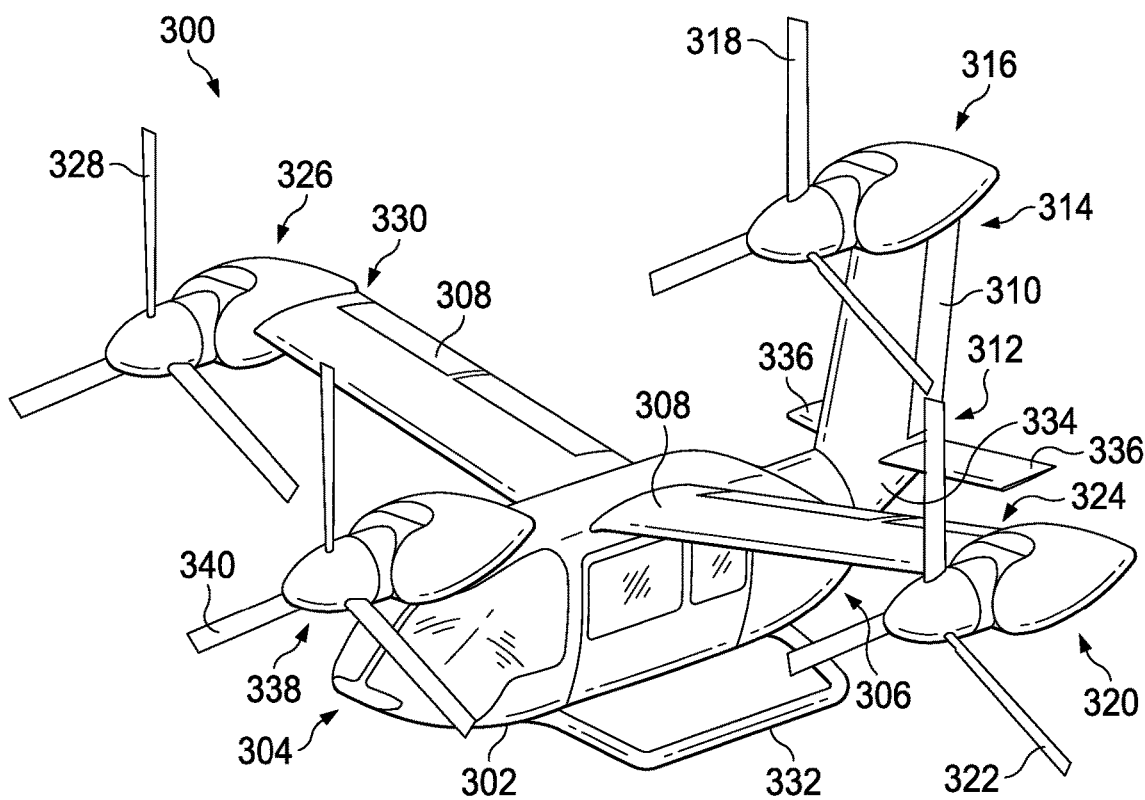
FIGS. 3A-3C illustrate an exemplary winged quad tiltrotor aircraft, in accordance with one or more exemplary embodiments of the present disclosure.
Figure 3B:
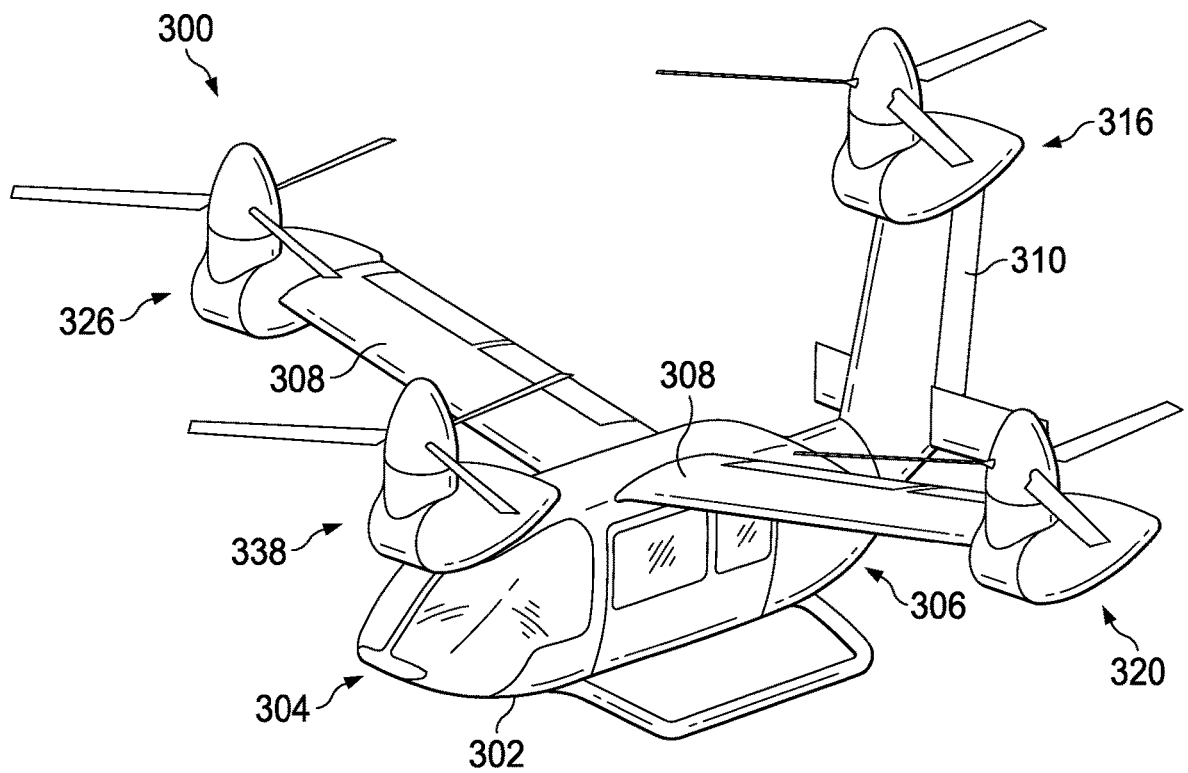
Figure 3C:
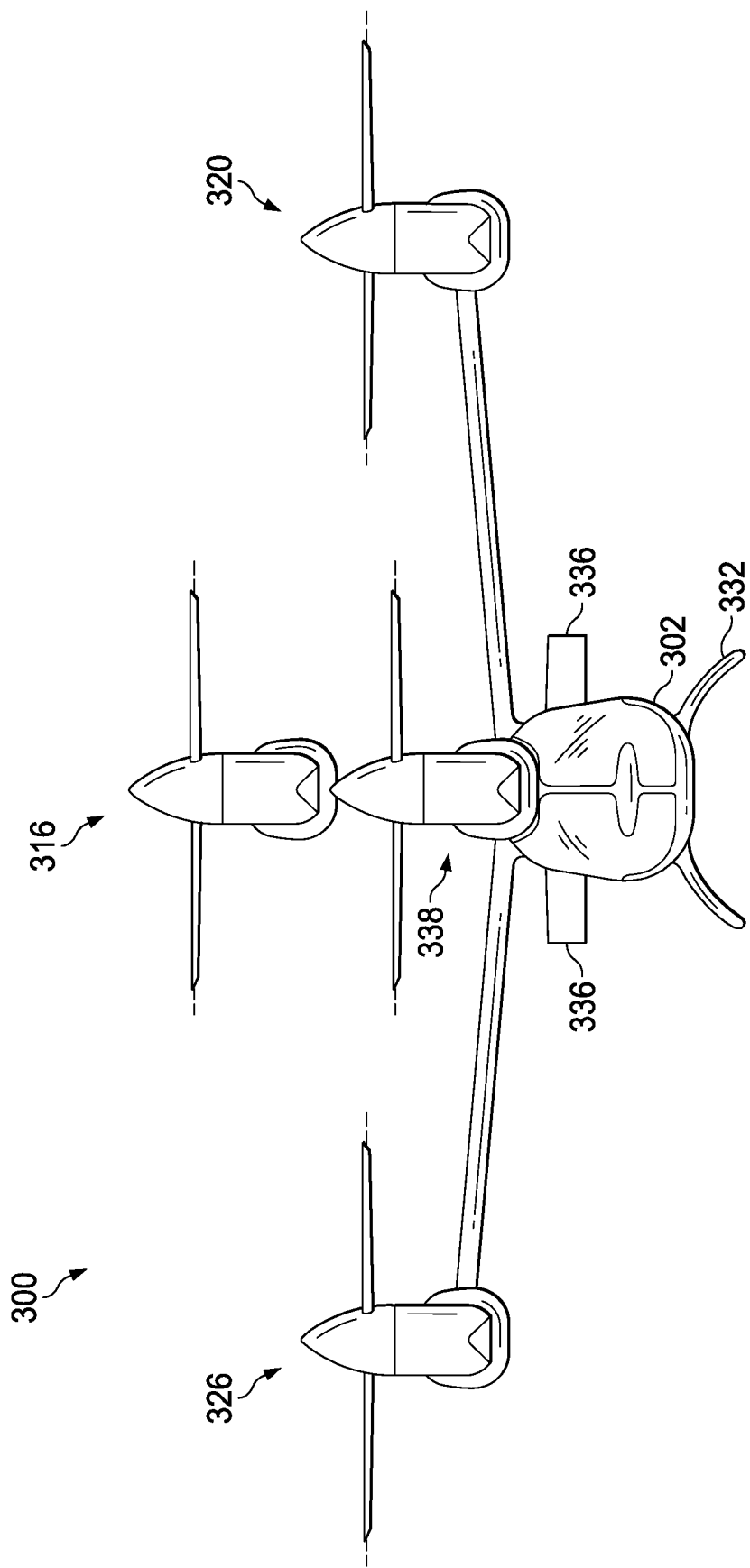

FIGS. 3A-3C depict another embodiment of a winged tiltrotor aircraft, in accordance with one or more embodiments of the present disclosure. In another embodiment, the aircraft 300 can include a port-side rotor assembly 320 proximate a port-side wing tip 324 of a wing assembly 308, and a starboard-side rotor assembly 326 proximate a starboard-side wing tip 330 of the wing assembly 308. In one embodiment, the wing assembly 308 can include one or more main wings, canard wings, fairings, stabilizers, booms, or any other suitable structure. In another embodiment, the aircraft 300 can include a forward rotor assembly operably coupled proximate a forward end 304 of an elongated member 302. In one embodiment, the aircraft 300 can include an elongated member 302 having a forward end 304 and an aft end 306. In another embodiment, the aircraft can include a wing assembly 308 operably coupled to the elongated member 302 between the forward and aft ends 304, 306. In another embodiment, the aircraft 300 can include a vertical member (e.g., vertical fin, pylon, etc.) 310 including a first end 312 operably coupled to the elongated member 302 and extending upwardly a first distance from the elongated member 302. In one embodiment, the vertical member 310 can be coupled to the elongated member 302. In another embodiment, the vertical member 310 can be coupled to the elongated member 302 via a tail structure 334.

In one embodiment, the aircraft 300 can include an aft rotor assembly 316 operably coupled to a second end 314 of the vertical member 310. In another embodiment, the aft rotor assembly 316 can include aft rotor blades 318. In another embodiment, the aft rotor blades 318 can have a length shorter than the first distance such that when the aft rotor assembly 316 is in a horizontal flight position (e.g., as depicted in FIG. 3A), the aft rotor blades 318 do not contact the elongated member 302 and/or tail structure 334. In another embodiment, the aircraft 300 can include a port-side rotor assembly 320 coupled to the wing assembly 308 proximate a port-side wing tip 324. For example, the port-side rotor assembly 320 can include port-side rotor blades 322. In another embodiment, the aircraft 300 can include a starboard-side rotor assembly 326 coupled to the wing assembly 308 proximate a starboard-side wing tip 330. In one embodiment, the starboard-side rotor assembly 326 can include starboard-side rotor blades 328. In another embodiment, the aircraft 300 can further include a forward rotor assembly 338 proximate the forward end 304 of the elongated member 302. For example, the forward rotor assembly 338 can include forward rotor blades 340. In another embodiment, the vertical member 310 can be part of an empennage. In another embodiment, the aircraft 300 can include a horizontal stabilizer 336. In another embodiment, the horizontal stabilizer 336 can be operably rotatable between a vertical position and a horizontal position. In another embodiment, the aircraft 300 can include skids, wheels, or other suitable landing gear 332.

In one embodiment, the aircraft 300 can be configured such that the overall torque effect on the aircraft 300 can be substantially zero. For example, each of the forward, aft, starboard-side, and port-side rotor assemblies 338, 316, 320, 326 can be configured to rotate at different speeds to counteract a torque effect produced by one or more of the rotor assemblies. In another embodiment, one or more of the rotor assemblies 338, 316, 320, 326 can include an articulated rotor and/or flapping rotor, such that differential control of one or more of the rotor assemblies 338, 316, 320, 326 can be utilized to counteract a torque effect produced by one or more of the other rotor assemblies. For example, one or more of the rotor assemblies 338, 316, 320, 326 can be configured to allow for adjustment of a single blade of the assembly and/or all of the blades of the assembly, such as to, for example, vary a torque effect produced by a one or more of the rotor assemblies 338, 316, 320, 326. In another embodiment, one or more of the rotor assemblies 338, 316, 320, 326 can include a canted rotor. In another embodiment, one or more of the rotor assemblies 338, 316, 320, 326 can include a coaxial rotor. In another embodiment, a swept area of one or more of the rotor assemblies 338, 316, 320, 326 can be smaller than a swept area of one or more other of the rotor assemblies 338, 316, 320, 326. For example, one of the rotor assemblies 338, 316, 320, 326 can produce less thrust and/or torque than one or more other of the rotor assemblies 338, 316, 320, 326. In another embodiment, rotor blades of one or more of the rotor assemblies 338, 316, 320, 326 can have a short length than rotor blades of one or more other of the rotor assemblies 338, 316, 320, 326. In another embodiment, all of the rotor assemblies can rotate at the same speed. In another embodiment, one or more of the rotor assemblies 338, 316, 320, 326 can include a rigid rotor.

Figure 4:
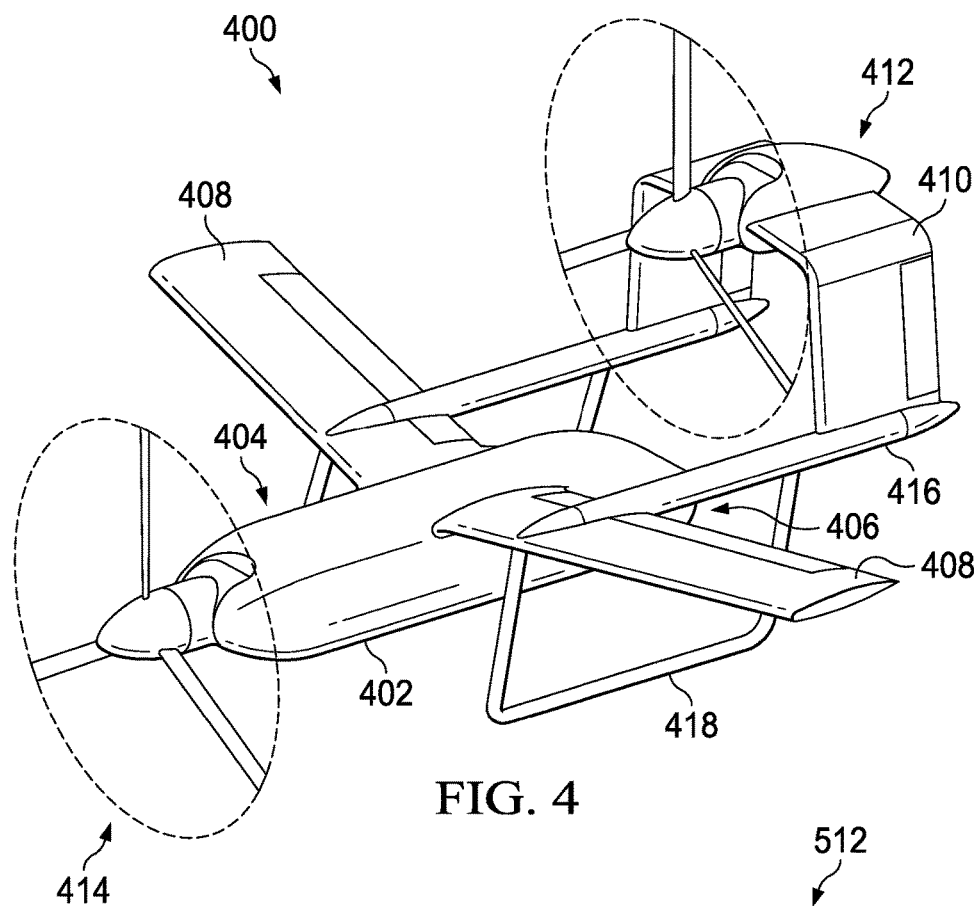
FIG. 4 illustrates an exemplary winged tiltrotor aircraft, in accordance with one or more exemplary embodiments of the present disclosure.

FIG. 4 depicts another embodiment of a winged tiltrotor aircraft, in accordance with one or more embodiments of the present disclosure. A winged tiltrotor aircraft 400 can include an elongated member 402 having a forward end 404 and an aft end 406. In one embodiment, the elongated member 402 can be configured with a chine. A chine can be a longitudinal line of sharp change in the cross-section profile of the elongated member 402 or similar body. Aerodynamically, the chine can act as an extension of the wing along the elongated member 402. In another embodiment, the chine can extend along a portion or the entirety of the elongated member 402 or similar body. In another embodiment, the chine can include a very sharp edge blending in with the main wing or other similar aircraft structure. Additionally, the chine can enhance a stealth profile of the aircraft 400. The winged tiltrotor aircraft 400 can be manned, unmanned, autonomous, or remote-controlled aircraft.

In one embodiment, the aircraft 400 can include a wing assembly 408 operably coupled to the elongated member 402 between the forward and aft ends 404, 406. In one embodiment, the wing assembly 608 can include one or more main wings, canard wings, fairings, stabilizers, booms, or other suitable structure. In another embodiment, the aircraft 400 can include a vertical member (e.g., vertical fin, pylon, etc.) 410 coupled proximate an aft end of the elongated member 402. In one embodiment, the winged tiltrotor aircraft 400 can include a plurality of vertical members 410 configured to support, for example, an aft rotor assembly 412. In another embodiment, the aircraft 400 can include a tail structure 416 disposed between the elongated member 402 and the one or more vertical members 410. In another embodiment, the tail structure 416 can include one or more tail booms, or other suitable structure.

In one embodiment, the aircraft 400 can include an aft rotor assembly 412 and a forward rotor assembly 414. For example, the aft rotor assembly 412 can be operably coupled to the vertical member 410. In another embodiment, and in accordance with the principles of the present disclosure, the aft rotor assembly 412 can be configured to rotate to a horizontal flight position such that blades of the rotor assembly 412 can be forward of the vertical fin 410 and rotate without contacting the elongated member 402 or tail structure 416. In one embodiment, the rotor assemblies 412, 414 can be operably rotatable between a vertical lift position and a horizontal flight position. In another embodiment, the tail structure 416 can be coupled to the elongated member 402 via the wing assembly 408. In another embodiment, the aircraft 400 can include any suitable landing gear 418. In one embodiment, the aircraft 400 can include a port-side tiltrotor assembly and a starboard-side tiltrotor assembly. In one embodiment, the aircraft 400 can be configured as a manned aircraft; in another embodiment, the aircraft 400 can be an Unmanned Aerial Vehicle (UAV).

Figure 5:
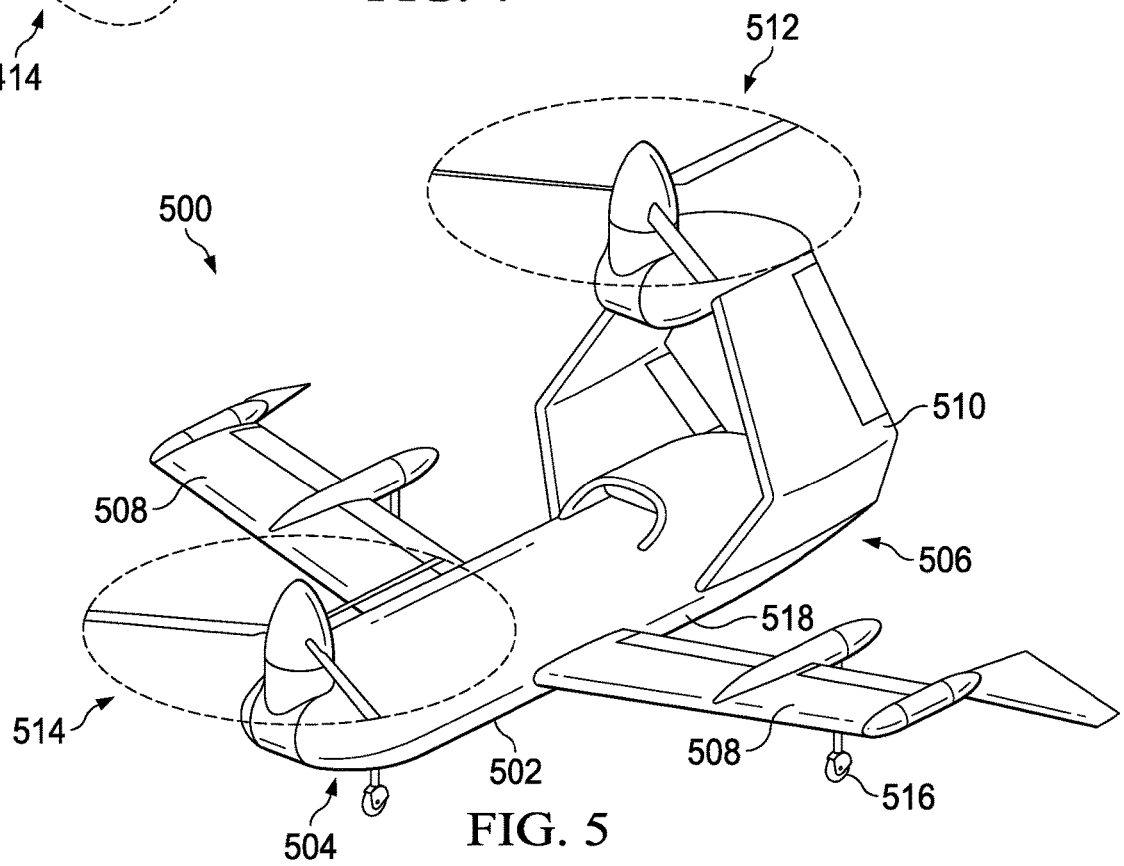
FIG. 5 illustrates an exemplary winged tiltrotor aircraft, in accordance with one or more exemplary embodiments of the present disclosure.

FIG. 5 depicts another embodiment of a winged tiltrotor aircraft, in accordance with one or more embodiments of the present disclosure. A winged tiltrotor aircraft 500 can include an elongated member 502 having a forward end 504 and an aft end 506. In one embodiment, the elongated member 502 can be configured with a chine. A chine 518 can be a longitudinal line of sharp change in the cross-section profile of the elongated member 502 or similar body. Aerodynamically, the chine can act as an extension of the wing along the elongated member 502. In another embodiment, the chine can extend along a portion or the entirety of the elongated member 502 or similar body. In another embodiment, the chine can include a very sharp edge blending in with the main wing or other similar aircraft structure. Additionally, the chine can enhance a stealth profile of the aircraft 500. The winged tiltrotor aircraft 500 can be manned, unmanned, autonomous, or remote-controlled aircraft. In another embodiment, the aircraft 500 can include a wing assembly 508 coupled to the elongated member. In one embodiment, the wing assembly 508 can include one or more main wings, canard wings, fairings, stabilizers, booms, or other suitable structure. In another embodiment, the aircraft 500 can include an aft rotor assembly 512 and a forward rotor assembly 514. In another embodiment, the aircraft 500 can include any suitable landing gear 516, such as skids or wheels.

In one embodiment, the aircraft 500 can include a vertical member (e.g., vertical fin, pylon, etc.) 510 coupled proximate an aft end of the elongated member 502. In another embodiment, the winged tiltrotor aircraft 500 can include a plurality of vertical members 510 configured to support, for example, an aft rotor assembly 512. In another embodiment, the aircraft 500 can include a tail structure 506 disposed between the elongated member 502 and the one or more vertical members 510. In another exemplary embodiment, the one or more vertical members can include a bend. For example, the bend can provide additional aerodynamic properties such as lift, boundary layer air reduction, or other suitable function. In another exemplary embodiment, vertical stabilizers can be disposed on the vertical member 510. For example, the vertical stabilizers can be disposed above or below the bend in the vertical member to suit a particular application. In another embodiment, the tail structure 506 can include one or more tail booms, or other suitable structure.

In one embodiment, the aft tiltrotor assembly 512 can be operably coupled to the vertical member 510, such as proximate a top portion of the vertical member 510. In one embodiment, the aircraft 500 can include a port-side tiltrotor assembly and a starboard-side tiltrotor assembly. In one embodiment, the rotor assemblies 512, 514 can be operably rotatable between a vertical lift position and a horizontal flight position. In one embodiment, the aircraft 500 can include a RAM air inlet. In another embodiment, one or more additional wing structures can be disposed proximate the wing tips to provide additional aerodynamic functionality.

Figure 6:
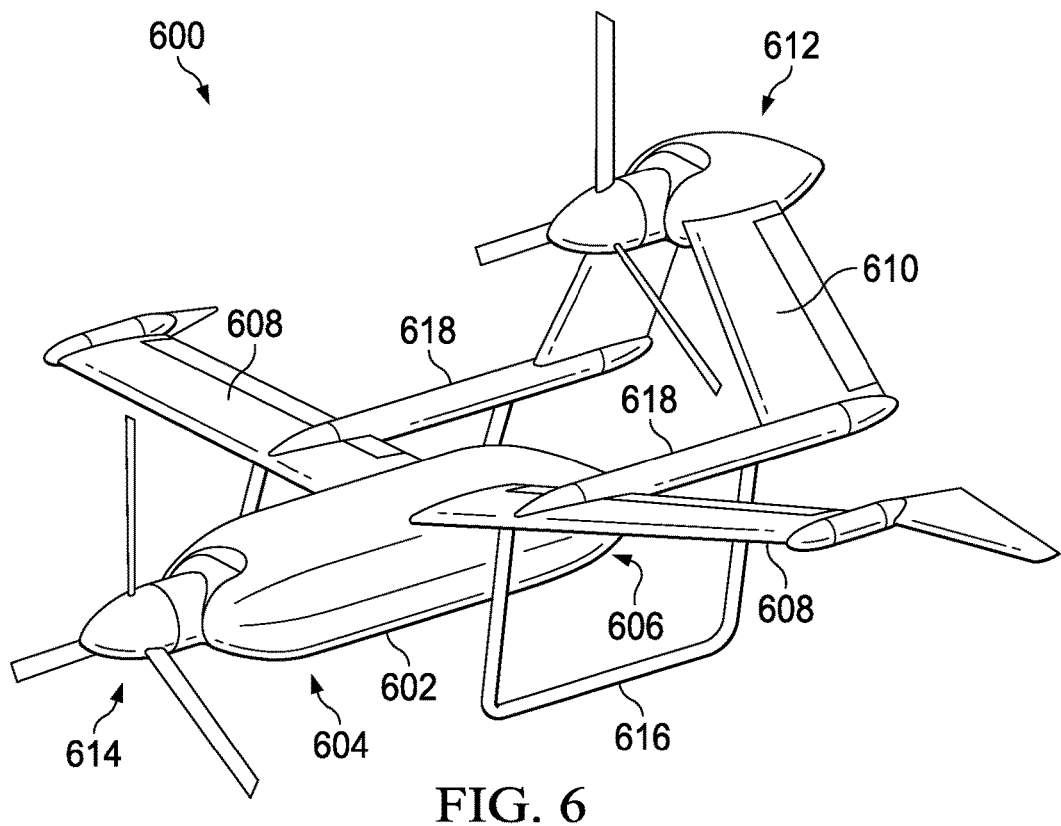
FIG. 6 illustrates an exemplary tandem tiltrotor aircraft, in accordance with one or more exemplary embodiments of the present disclosure.

FIG. 6 depicts another embodiment of a winged tiltrotor aircraft, in accordance with one or more embodiments of the present disclosure. In one embodiment, the aircraft 600 can include an elongated member 602 having forward and aft ends 604, 606. In another embodiment, the aircraft 600 can include a wing assembly 608. In one embodiment, the wing assembly 608 can include one or more main wings, canard wings, fairings, stabilizers, booms, or any other suitable structure. In another embodiment, the aircraft 600 can include a vertical member 610 (e.g., vertical fin, pylon, etc.).

In one embodiment, the vertical member 610 can include two complimentary members coupled proximate an aft end 606 of the elongated member 602. In one embodiment, the aft tiltrotor assembly 612 can be operably coupled to the vertical member 610, such as proximate a top portion of the vertical member 610. In another embodiment, the aircraft 600 can include a tail structure 618 disposed between the elongated member 602 and the vertical member 610. In another embodiment, the tail structure 618 can be coupled to the wing assembly 608 and the vertical member 610. In another embodiment, the aircraft 600 can include any suitable landing gear 616. In one embodiment, the rotor assemblies 612, 614 can be operably rotatable between a vertical lift position and a horizontal flight position. In one embodiment, the aircraft 600 can include a port-side tiltrotor assembly and a starboard-side tiltrotor assembly. In one embodiment, the aircraft 600 can be configured as a manned aircraft; in another embodiment, the aircraft 600 can be an Unmanned Aerial Vehicle (UAV). In another embodiment, the wings can be swept forward or aft.

Figure 7:
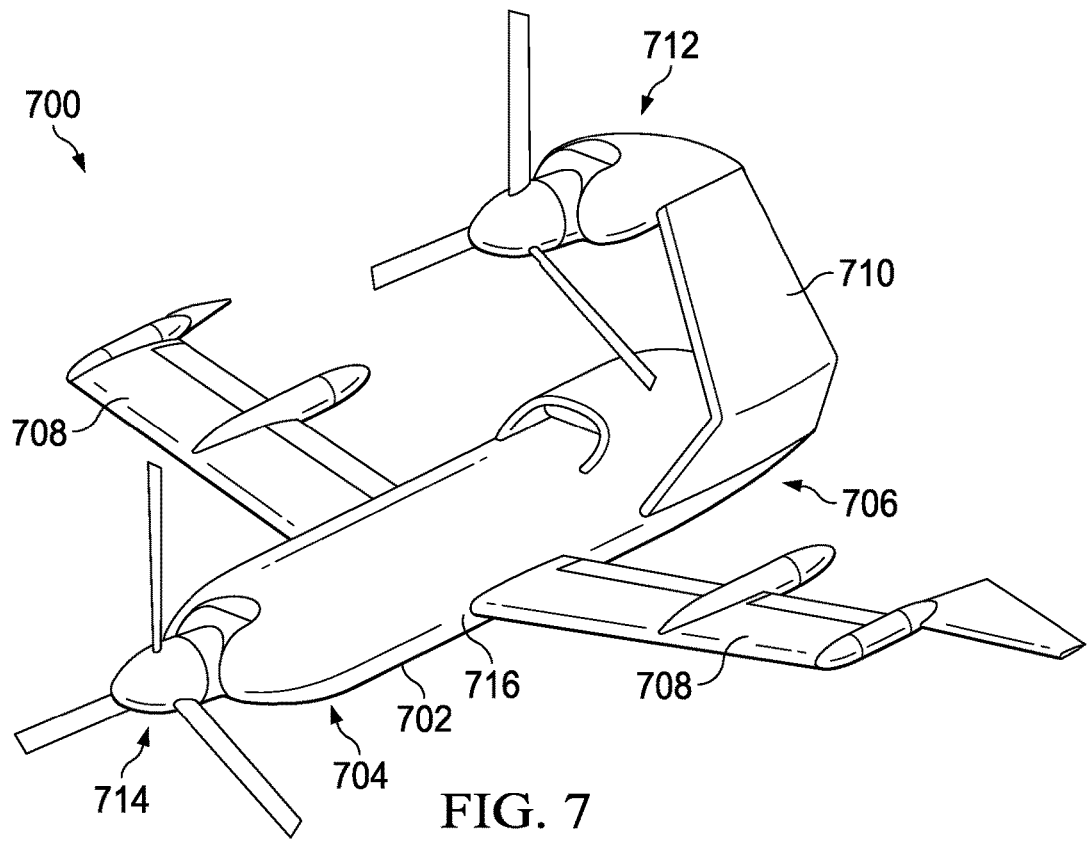
FIG. 7 illustrates an exemplary winged tandem tiltrotor aircraft, in accordance with one or more exemplary embodiments of the present disclosure.

FIG. 7 depicts another embodiment of a winged tiltrotor aircraft, in accordance with one or more embodiments of the present disclosure. In one embodiment, the aircraft 700 can include an elongated member 702 having forward and aft ends 704, 706, a wing assembly 708, and a vertical member (e.g., vertical fin, pylon, etc.) 710. In one embodiment, the vertical member 710 can include a solitary member extending upwards proximate the aft end 706 of the aircraft. In another embodiment, the aircraft 700 can include an aft rotor assembly 712 and a forward rotor assembly 714. In another embodiment, the aft rotor assembly 712 can be coupled to the vertical member 710. In another embodiment, the rotor assemblies 712, 714 can be operably rotatable between a vertical lift position and a horizontal flight position. be configured to assume a horizontal flight position and a vertical. In one embodiment, the aircraft 700 can include a port-side tiltrotor assembly and a starboard-side tiltrotor assembly. In another embodiment, the aircraft 700 can include a chine 716, such as to enhance a stealth profile of the aircraft 700. In one embodiment, the aircraft 700 can be configured as a manned aircraft; in another embodiment, the aircraft 700 can be an Unmanned Aerial Vehicle (UAV). In one embodiment, the aircraft 500 can include a RAM air inlet. In another embodiment, one or more additional wing structures can be disposed proximate the wing tips to provide additional aerodynamic functionality.

In one embodiment, aircrafts designed in accordance with the principles of the present disclosure can enable storage of an aircraft within a container. For example, in one embodiment, aircrafts with forward and aft rotor assemblies that, in one example, do not have rotor assemblies located on the wing assembly (e.g., exemplary aircrafts 100, 400, 500, 600, 700) can include lighter and/or less cumbersome wing assembles as compared to aircraft having rotor assemblies coupled to the wing assemblies. In another embodiment, the wing assemblies disclosed herein can be capable of folding. In one embodiment, the wing assemblies can be capable of rotating. In one embodiment, the wing assemblies 108, 408, 508, 608, and 708 can be capable of folding, such as to position a longitudinal axis of the wing assembly to be substantially parallel with a longitudinal axis of an elongated member. In another embodiment, wing assemblies 208 and 308 can be capable of rotating about a central point of the wing assembly 208, 308 such that, e.g., wing tips (e.g. 224, 230, 324, 300) can be substantially aligned with a longitudinal axis of an elongated member. In another embodiment, the aircraft disclosed herein can be capable of fitting in an intermodal container. In another embodiment, the aircraft disclosed herein can be capable of fitting inside an ISO container. In another embodiment, the aircraft disclosed herein can be capable of fitting in a container with dimensions of 20 feet×8 feet×8 feet. In another embodiment, the aircraft disclosed herein can be capable of fitting into any suitable container. In another embodiment, a folding and/or rotation of the wing assembly of the aircraft can facilitate storage of the aircraft in any suitable container.

In one embodiment, aircrafts disclosed herein with forward and aft rotor assemblies that, in one example, can place the forward rotor assembly on a lower plane as compared to the aft rotor assembly. For example, aircrafts having tiltrotor assemblies in tandem (e.g., in one embodiment, aircrafts 100, 400, 500, 600, 700) can place the forward rotor assembly as close to a longitudinal axis of an elongated member to which it is coupled, such as to place the forward rotor assembly as close to the center of gravity of the aircraft as possible. In another embodiment, tail structures in accordance with the principles of the present disclosure can also provide significant advantages. For example, a tail structure that can include twin tail booms (examples of which can be seen at, e.g., 416 and 618) can provide access to an aft end of an elongated member of the aircraft. In one embodiment, such access can enable, for example, access to a loading area of the aircraft. It will be understood by those having skill in the art that other configurations can achieve similar advantages. For example, a hatch can be included in a tail structure, proximate an aft end of an elongated member, and/or under a vertical member. In one embodiment, any of the aircraft disclosed herein can be configured as a manned aircraft; in another embodiment, any of the aircrafts disclosed herein can be an Unmanned Aerial Vehicle (UAV).

In another embodiment, any of the aircrafts disclosed herein can incorporate any number of designs or aspects operable in enhance a stealth profile of the aircraft. For example, the aircrafts can include one or more chines (e.g., chine 518 and chine 716) that can be configured to reduce a signature of the aircraft, such as a radar signature.

The rotor assemblies discussed herein are not limited to any specific design. Each of the aircraft disclosed herein can include any of the wing assemblies, tail assemblies, RAM air inlets, or other limitations of any of the embodiments disclosed. The embodiments disclose any type of rotor assembly used or potentially used in the propulsion of aircraft. In one embodiment, the rotors assemblies can be propeller type rotors, each assembly comprising a plurality of propeller blades. In another embodiment, the rotor assemblies discussed herein are also capable of rotating to at least two positions (e.g., vertical lift position and horizontal flight position). In another embodiment, the rotor assemblies discussed herein can be capable of rotating any appropriate amount. For example, the forward and aft rotor assemblies discussed herein can, in one embodiment, rotate anywhere between 0° and 90°. In another embodiment, the forward and aft rotor assemblies discussed herein can rotate any amount that can place the rotor in a desirable position without the rotor contacting the elongated member during operation. In another embodiment, the rotor assemblies discussed herein can rotate independently or in unison. In one embodiment, the rotor assemblies discussed herein can be electric; in another embodiment, the rotor assemblies discussed herein can utilize gas, diesel, or any other suitable fuel and/or energy source.

In another embodiment, the principles of the present disclosure can offer significant advantages in the art. For example, an aircraft with a forward rotor assembly and/or an aft rotor assembly can have increased pitch control as compared to traditional tiltrotor aircraft that have rotors just on the wings.

The present invention achieves at least the following advantages:

1. Tandem tilt rotor allows vertical takeoff and landing capabilities while enabling a horizontal flight position that places the aft rotor in a forward position, such that the aft rotor can better produce forward thrust in horizontal flight mode;

2. Improved center of gravity (CG) envelope in helicopter mode and thus better airplane mode placement;

3. Increased pitch control by placing tiltrotor assembly along a longitudinal axis of the aircraft;

4. Increased storability by incorporating folding or rotating wing assembly;

5. Increased storability by decreasing wing assembly weight and/or size and coupling tiltrotor assemblies to an elongated member;

6. Increased vertical lift and horizontal thrust by incorporating two or more tiltrotor assemblies;

7. Can fly off rotors to higher speeds with rotor-borne flight through stall region; and 8. Better CG envelope as helicopter mode CG can be compensated with differential thrust allowing for better airplane mode CG placement.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different rotor diameters for the forward and aft rotor assemblies, orthogonal rotor assemblies, full cyclic or only lateral, and variable RPM vs. collective at small scale are all within the scope of the present disclosure. Further, the individual elements of the claims are not well-understood, routine, or conventional. Instead, the claims are directed to the unconventional inventive concept described in the specification.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A winged triple tiltrotor aircraft, comprising:
   an elongated member having a forward end, an aft end, and a longitudinal axis extending through the elongated member;
   a wing assembly operably coupled to the elongated member at a point between the forward end and the aft end;
   a vertical member having a first end operably coupled to the elongated member and upwardly extending a first distance from the elongated member;
   a horizontal stabilizer comprising two horizontal fins coupled directly to opposite sides of the vertical member, wherein entire lengths of the two horizontal fins are each configured to rotate between a vertical position and a horizontal position;
   an aft rotor assembly having aft rotor blades and operably coupled to a second end of the vertical member, the aft rotor assembly operably rotatable between a vertical lift position and a horizontal flight position, in line with the longitudinal axis of the elongated member;
   a port-side rotor assembly having port-side rotor blades and operably coupled to the wing assembly proximate a port-side wing tip, wherein the port-side rotor assembly is operably rotatable between a vertical lift position and a horizontal flight position; and
   a starboard-side rotor assembly having starboard-side rotor blades and operably coupled to the wing assembly proximate a starboard-side wing tip, wherein the starboard-side rotor assembly is operably rotatable between a vertical lift position and a horizontal flight position;
   wherein the aft rotor blades have a length shorter than the first distance such that the aft rotor blades do not contact the elongated member; and
   wherein the vertical position of the two horizontal fins of the horizontal stabilizer comprises a position that reduces a profile of the horizontal stabilizer to downward air generated by the aft rotor assembly when the aft rotor assembly is in the vertical lift position as compared to when the two horizontal fins of the horizontal stabilizer are in the horizontal position.

2. The winged triple tiltrotor aircraft of claim 1, wherein the elongated member is a fuselage or nacelle.

3. The winged triple tiltrotor aircraft of claim 1, wherein the tiltrotor aircraft is configured to adjust rotational speeds of the rotor assemblies to counteract a torque effect produced by one or more of the rotor assemblies.

4. The winged triple tiltrotor aircraft of claim 1, further comprising a tail structure disposed between the elongated member and the vertical member.

5. The winged triple tiltrotor aircraft of claim 1, wherein the vertical member is part of an empennage.

6. The winged triple tiltrotor aircraft of claim 1, wherein the tiltrotor aircraft is unmanned.

7. The winged triple tiltrotor aircraft of claim 1, further comprising a chine.

8. The winged triple tiltrotor aircraft of claim 1, wherein at least one of the aft rotor assembly, the port-side rotor assembly, and the starboard-side rotor assembly comprises an articulated rotor.

9. A method of operating a tiltrotor aircraft having an odd number of rotor assemblies, the method comprising the steps of:
   initiating a first rotor assembly and a second rotor assembly disposed in a first plane, and a third rotor assembly disposed in a second plane, wherein each of the first, second, and third rotor assemblies have rotor blades and are operably rotatable between a vertical lift position and a horizontal flight position;
   rotating a horizontal stabilizer to a vertical position when the third rotor assembly is in the vertical lift position, the horizontal stabilizer comprising two horizontal fins coupled directly to opposite sides of the vertical member, wherein entire lengths of the two horizontal fins are each configured to rotate between the vertical position and a horizontal position, wherein the vertical position comprises a position that reduces a profile of the horizontal stabilizer to downward air generated by the third rotor assembly as compared to when the horizontal stabilizer is in the horizontal position; and
   counteracting a torque effect caused by at least one of the first, second, or third rotor assemblies with at least one other of the first, second, or third rotor assemblies.

10. The method of claim 9, wherein the tiltrotor aircraft utilizes differential control of at least one of the first, second, or third rotor assemblies to counteract a torque effect produced by at least one other of the first, second, or third rotor assemblies.

11. The method of claim 9, wherein a swept area of at least one of the first, second, or third rotor assemblies is smaller than a swept area of at least one other of the first, second, or third rotor assemblies.

12. The method of claim 9, wherein the first rotor assembly is positioned on the port side of an elongated member.

13. The method of claim 12, wherein the first rotor assembly includes port-side rotor blades and is operably coupled to a wing assembly proximate a port-side wing tip.

14. The method of claim 9, wherein the second rotor assembly is positioned on the starboard side of an elongated member.

15. The method of claim 14, wherein the second rotor assembly includes starboard-side rotor blades and is operably coupled to a wing assembly proximate a starboard-side wing tip.

16. The method of claim 9, wherein the third rotor assembly is positioned proximate an aft end of an elongated member.

17. The method of claim 16, wherein the third rotor assembly includes aft rotor blades and is operably coupled in line with a longitudinal axis of the elongated member.

18. The method of claim 16, wherein the tiltrotor aircraft further includes a vertical member operably coupled to the elongated member and the third rotor assembly.

19. The method of claim 18, wherein the vertical member is part of an empennage.

20. The method of claim 9, wherein the aft rotor blades have a length such that the aft rotor blades do not contact the elongated member.

21. The method of claim 9, wherein the elongated member is a fuselage or nacelle.

22. The method of claim 9, wherein counteracting the torque effect includes adjusting rotational speeds of the rotor assemblies to counteract the torque effect produced by one or more of the rotor assemblies.

23. The method of claim 9, wherein the tiltrotor aircraft is unmanned.

24. The method of claim 9, wherein the elongated member includes a chine.

25. The method of claim 24, wherein the chine extends along at least a portion of the elongated member.

* * * * *